United States Patent
Uchino

[11] 3,974,570
[45] Aug. 17, 1976

[54] INDICATOR FOR MEASURING APPARATUS

[75] Inventor: Kenju Uchino, Utsunomiya, Japan

[73] Assignee: Kabushiki Kaisha Mitutoyo Seisakusho, Tokyo, Japan

[22] Filed: Aug. 13, 1974

[21] Appl. No.: 496,990

[30] Foreign Application Priority Data
Aug. 15, 1973   Japan.............................. 48-091517

[52] U.S. Cl............................................. 33/147 T
[51] Int. Cl.².......................................... G01B 3/20
[58] Field of Search .......... 33/147 T, 147 J, 147 H, 33/143 M, 143 J, 143 K

[56] References Cited
UNITED STATES PATENTS 2,846,769   8/1958   Colont............................... 33/147 T
2,898,684   8/1959   Schneider.......................... 33/147 T FOREIGN PATENTS OR APPLICATIONS
489,774   5/1970   Switzerland...................... 33/147 J Primary Examiner—Richard E. Aegerter
Assistant Examiner—Willis Little
Attorney, Agent, or Firm—Brisebois & Kruger

[57] ABSTRACT

An indicator for a measuring apparatus comprising a rigid ruler, a slider mounted to slide along said ruler, and a dial plate having scales graduated in different units for indicating the amount of displacement of said slider in different units, said dial plate being provided with two needles arranged to be moved in dependence on the linear displacement of said slider by their respective rotating mechanism so as to indicate the amount of said displacement in different units.

1 Claim, 2 Drawing Figures

INDICATOR FOR MEASURING APPARATUS

BACKGROUND OF THE INVENTION

In the commonly used measured value indicators, the measured value, such as amount or size, is indicated by a single unit on a dial plate. Therefore, when it is desired to convert for example, the unit of millimeters into the unit of inches, one must use a conversion table or mental calculations, which would require time and labor.

SUMMARY OF THE INVENTION

The present invention is intended to eliminate the above problem, and an object of the invention, therefore, is to provide a measuring apparatus in which the measured amount is indicated by two scales graduated in two different units, such for example as graduations in millimeters and in inches or graduations in 0.01mm and in 0.05mm.

Another object of the present invention is to provide a measuring apparatus in which every measured amount is indicated in different units by two pointers on a dial plate secured to a slider, said pointers being operated by two different transmitting systems through respective rotation transmitting mechanisms travelling along a rack provided along the rigid ruler of the apparatus.

Still another object of the present invention is to provide a measuring device in which a backlash eliminating mechanism is incorporated in each rotation transmitting mechanism so as to allow accurate indication of the two different unit measurements.

Other objects of the present invention will become apparent from the following detailed description of a preferred embodiment of the invention and the accompanying drawings which diagrammatically illustrate said embodiment.

DESCRIPTION OF THE PREFERRED EMBODIMENT

Figure 1:
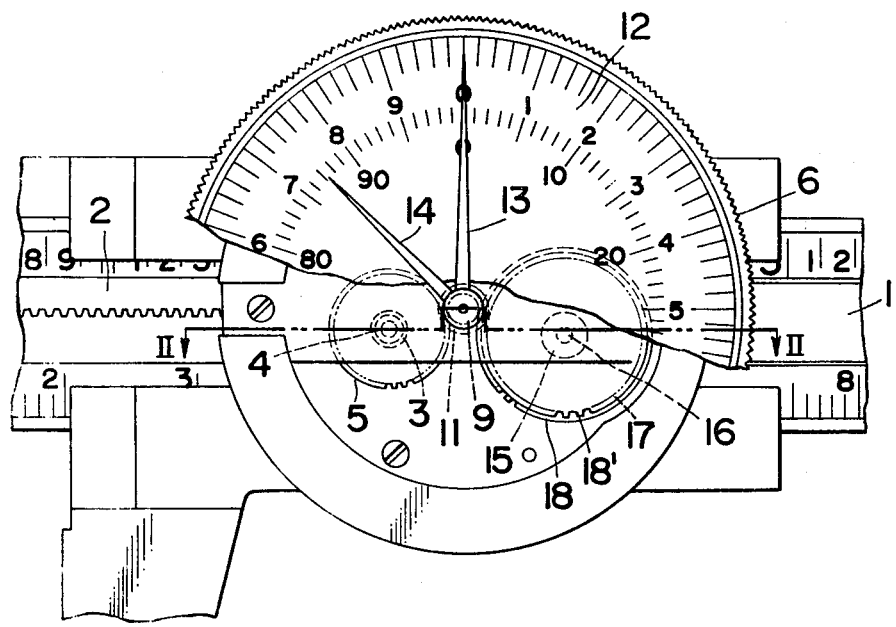
FIG. 1 is a plan view of a set of slide calipers in which the present invention is incorporated.
Figure 2:
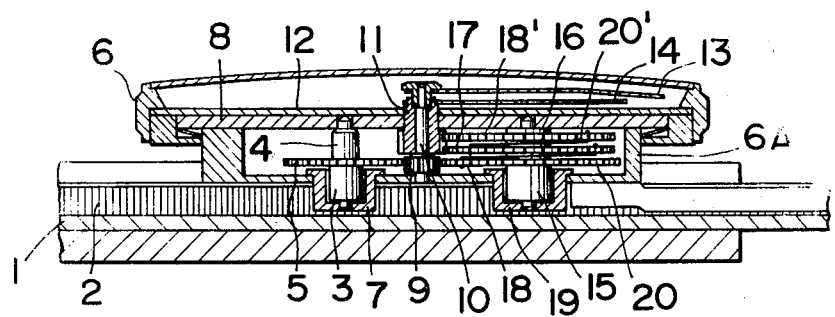
FIG. 2 is a sectional view taken along the line II—II of FIG. 1.

FIGS. 1 and 2 show an application of the present invention to a set of slide calipers. It will be seen that a slider 6 is slidably mounted on the rigid ruler 1 of the slide calipers, and a rack 2 extends along the ruler 1 in the direction in which the slider 6 slides. A first shaft 4 is rotatably supported between a bush 7 in the slider 6 and a support plate 8. This first shaft 4 carries a first pinion 3 which meshes with the rack 2. Also secured to the first shaft 4 is a first intermediate gear 5. A driving shaft 10 extends between the slider frame 6A and the support plate 8. This shaft 10 carries a first driven gear 9 which meshes with the first intermediate gear 5. A dial plate 12 is mounted on the upper surface of the support plate 8, and a first pointer 13 on said dial plate is secured to a projecting end of the driving shaft 10. A second shaft 16 is rotatably supported between the support plate 8 and a bush 19. This second shaft carries a second pinion 15 meshing with the rack 2, and a second intermediate gear 17 is secured to said second shaft 16. A second pointer 14 is secured to one end of a second driven gear 11 projecting from the dial plate 12.

Rotatably mounted on the lower and upper sides of the intermediate gear 17 on the second shaft 16, are the first and second gears 18 and 18', with the first gear 18 meshing with the first driven gear 9 and the second gear 18' meshing with the second driven gear 11. The first gear 18 and the second intermediate gear 17 are connected by a spiral spring 20, and the second gear 18' and the second intermediate gear 17 are connected by a spiral spring 20'. These springs 20 and 20' are adapted to urge said first and second gears 18 and 18' to rotate in opposite directions so as to eliminate backlash between said gears during their engagement.

In operation, when the slider 6 is displaced linearly along the rack 2 in FIG. 2, the linear movement of the slider 6 is converted into a rotating movement by the first and second pinions 3 and 15 meshing with the rack 2. The first driven shaft 10 is thereby rotated through one of the rotation transmitting mechanisms, that is, the first intermediate gear 5 and first driving gear 9, which rotate with the first pinion 3, so that the first pointer 13 directly connected thereto points to a division on one of the scales on the dial plate 12. On the other hand, the second pointer 14 directly connected to the second driven gear 11 is rotated by the other rotation transmitting mechanism, that is, the second intermediate gear 17 and the second driving gear 11, which rotate with the second pinion 15, so as to point to a division on the other scale calibrated in different units from those of the first-mentioned scale on the dial plate 12. Thus, the amount of displacement of the slider 6 is indicated by both first and second pointers 13 and 14 on the scales calibrated in different units on the dial plate 12. The gear ratios between the first and second pinions 3, 15, between the first intermediate gear 5 and the first driven gear 9 and between the second intermediate gear 17 and the second driven gear 11 are suitably selected in advance so that when, for example, indicating the graduations in inches by the first pointer 13 and in millimeters by the second pointer 14, it is also possible to graduate the two scales in 0.01 mm and 0.05 mm, respectively. Therefore, there is no need to use a conversion table when converting the reading in inch graduations into the reading in millimeter graduations, or vice versa, thus greatly improving the efficiency of measuring operations.

Also, since the first gear 18 and the second gear 18' are constantly urged to rotate in opposite directions relative to the second intermediate gear 17 by using two springs 20 and 20', it is possible to eliminate any backlash that could be produced by engagement between the first intermediate gear 5 and the first driving gear 9 and between the second intermediate gear 17 and the second driven gear 11, thus allowing accurate transmission of the rotational movement of the first pinion 3 and the second pinion 15 to the first driven gear 9 and the second driven gear 11, respectively, so that the amount of any displacement of the slider 6 can be correctly indicated on the dial plate by the two needles 13 and 14.

While the present invention has been described in terms of an embodiment in which it is applied to a set of slide calipers, the invention is, of course, not limited to such a particular embodiment but can be applied to other types of measuring apparatus such as, for example, a height gauge.

What is claimed is:

1. A measuring device comprising a rigid elongated member, a slider mounted to slide along said elongated member, an indicator comprising:
- a rack extending along the elongated member in the direction of movement of the slider,
- two gear trains having different gear ratios, each train comprising a shaft supported by said slider a pinion meshing with said rack and fixed to said shaft, an intermediate gear fixed to said shaft, and a driven gear driven by said intermediate gear;
- a first pointer connected to be rotated by one of said driven gears and a second pointer connected to be rotated by the other of said driven gears, said first and second pointers being mounted to rotate about a common axis;
- first and second backlash gears rotatably mounted on the shaft to which one of said intermediate gears is fixed, on opposite sides of said one intermediate gear, said first backlash gear meshing with one of said driven gears and said second backlash gear meshing with the other of said driven gears, and
- spring means between said first backlash gear and said one intermediate gear and between said second backlash gear and said one intermediate gear, urging said backlash gears in opposite directions relative to said one intermediate gear to eliminate backlash in said gear trains.

* * * * *